United States Patent [19]

Okamoto et al.

[11] Patent Number: 5,280,221

[45] Date of Patent: Jan. 18, 1994

[54] THIN-FILM COLD CATHODE STRUCTURE AND DEVICE USING THE SAME

[75] Inventors: Shinji Okamoto, Kawasaki; Eiichiro Nakazawa, Machida, both of Japan

[73] Assignee: Nippon Hoso Kyokai, Tokyo, Japan

[21] Appl. No.: 795,125

[22] Filed: Nov. 20, 1991

[30] Foreign Application Priority Data

Apr. 10, 1991 [JP] Japan .................................. 3-077807

[51] Int. Cl.$^5$ ............................................... H01J 1/02
[52] U.S. Cl. ................................ 315/169.1; 315/169.3; 313/306; 313/346 R; 313/506
[58] Field of Search ............... 315/169.1, 169.3, 169.4; 313/346R; 444, 446, 495, 496, 506, 509, 306

[56] References Cited

U.S. PATENT DOCUMENTS

| | | | |
|---|---|---|---|
| 3,334,248 | 8/1967 | Stratton | 313/346 R |
| 3,445,281 | 5/1969 | Sullivan | |
| 3,735,186 | 5/1973 | Klopfer et al. | 33/346 R |
| 4,801,994 | 1/1989 | Van Gorkom et al. | 313/346 R X |
| 5,066,883 | 11/1991 | Yoshioka et al. | 33/346 R |

FOREIGN PATENT DOCUMENTS 0351263 6/1989 European Pat. Off. .
0394698 3/1990 European Pat. Off. .

OTHER PUBLICATIONS

Journal of Applied Physics, vol. 47, No. 12, Dec. 1986, pp. 5248-5263.
Journal of Applied Physics, vol. 32, No. 4, Apr. 1961, pp. 646-652.
J. Vac. Sci. Technical. B4(1), Jan./Feb. 1986, pp. 108-111.
Adrian Kitai et al., Thin Film ZnS Cold-Cathode Emitter, SID 91 Digest, pp. 440-443.
Japanese Journal of Applied Physics, vol. 30, No. 7B, Jul. 15, 1991: S. Okamoto et al. "Thin-Film Cathode Using ZnS Layer", pp. 1321-1323.
International Journal of Electronics, vol. 69, No. 1, pp. 65-78: L. Eckertova, "Metal-insulator-metal and metal-insulator structures as electron sources".

Primary Examiner—Eugene R. LaRoche
Assistant Examiner—Son Dinh
Attorney, Agent, or Firm—Antonelli, Terry, Stout & Kraus

[57] ABSTRACT

A cold cathode device includes a first electrode formed on a substrate, an insulating film formed on the first electrode, a thin film formed on the insulating film and for generating hot electrons, a second electrode formed on the thin film. Electrons are injected from the second electrode at a first half cycle of each cycle of an a.c. voltage. The injected electrons form a space charge layer between the insulating film and the thin film. At a second half cycle of each cycle, the hot electrons are generated from the electrons stored in the space charge layer inside of the thin film, and emitted from the second electrode.

31 Claims, 4 Drawing Sheets

THIN-FILM COLD CATHODE STRUCTURE AND DEVICE USING THE SAME

BACKGROUND OF THE INVENTION

1. FIELD OF THE INVENTION

The present invention relates to a source for generating electrons, and more particularly to a thin-film cold cathode structure which may be used for a planar display, an imaging tube, a vacuum tube, an electron line lithography, and an analyzing apparatus.

2. DESCRIPTION OF RELATED ART

There have been conventionally known cold cathode devices of various types such as a field emission type, a tunnel type, and an avalanche type.

As shown in FIG. 1A, in the field emission type of cold cathode device, electrons are emitted from a tip of a conical emitter corn formed on an emitter chip by using a gate field. However, this type of cold cathode device has some difficulty in stably emitting electrons, because the emitter corn may be damaged when ionized particles collide with the emitter corn and the absorbed particles act to lower the strength of an electric field at the tip of the emitter corn. To overcome this difficulty, it is necessary to disadvantageously locate the cold cathode device in a super high vacuum. Further, to obtain large electron current, it is also necessary to disadvantageously prepare a large number of lot of emitter chips and implement a complicated technique for a fine structure.

Turning to FIG. 1B, in the tunnel type of cold cathode device, the electrons which pass through a thin insulating film by the tunneling effect are emitted. To bring about the tunneling effect, the insulating film is required to be far thinner. In actuality, however, it is difficult to manufacture an extremely thin insulating film. Further, the thin insulating film is not stable in characteristic and in rapid in degradation.

Turning to FIG. 1C, in the avalanche type of cold cathode device electrons are emitted from part of a current that flows through a reversely-biased p-n junction of a diode. Disadvantageously, however, the efficiency is very low in emitting the electrons from the diode current that flows through the p-n junction. Like the field emission type device, electrons are emitted in a dotted manner. To obtain planar electron emission, therefore, it is necessary to integrate this avalanche type of cold cathode device. This means that it is difficult to extend this type of cold cathode device over the large area in light of the integrating technique.

In addition to the foregoing disadvantages, the conventional cold cathode devices suffer from large fluctuations of the emitted electron current, and the electron current changes in time. Hence, they cannot provide stable operation. Moreover, the conventional cold cathode devices do not have a long life, and some types of the devices require a complicated manufacturing process. This results in disadvantageously lowering their yield and thereby raising the manufacturing cost.

SUMMARY OF THE INVENTION

The present invention is made in light of the above disadvantages, and has, as an object, to provide a cold cathode device structure which has small only a fluctuation of emitted electron current and only a small change of the electron current in time, and which has a long duration of time.

It is another object of the present invention to provide a device which uses the cold cathode device mentioned above.

In carrying out the foregoing objects, the cold cathode device structure includes a first electrode, an insulating film formed on the first electrode, a thin film formed on the insulating film, and a second electrode formed on the thin film.

In the cold cathode device of the present invention, electrons are injected when the second electrode is negatively biased. The electrons are stored in a junction portion between the insulating film and the thin film. On the contrary, when the second electrode is positively biased, the electric field caused in the thin film becomes strong enough to generate hot electrons. This is because an electric field formed by the space charge by the electrons stored in the earlier half of a cycle, as well as an electric field by the voltage applied from the exterior contribute to increase in the electric field applied to the thin film. As a result, hot electrons having higher energy than a work function $\phi M$ of the second electrode can be emitted.

As apparent from the above description, in the cold cathode device structure according to the present invention influence by the absorbed gaseous particles is small because of the hot electrons and the present invention does not require super high vacuum, unlike the field emission type of cold cathode device. Also, the cold cathode device structure of the present invention is small in fluctuation of emitted electron current, and, therefore, has a long life. Further, unlike the conventional tunneling type of cold cathode device, the cold cathode device of the present invention does not require a thin film but instead uses laminated thin films. As a result, it can be made easier to manufacture the cold cathode device, and it is possible to increase the area of the cold cathode device.

DESCRIPTION OF THE PREFERRED EMBODIMENT

With reference to the appended drawings, a cold cathode device according to an embodiment of the present invention will be described below in detail, taking as an example a planar display device to which the cold cathode device is applied.

Figure 1A:
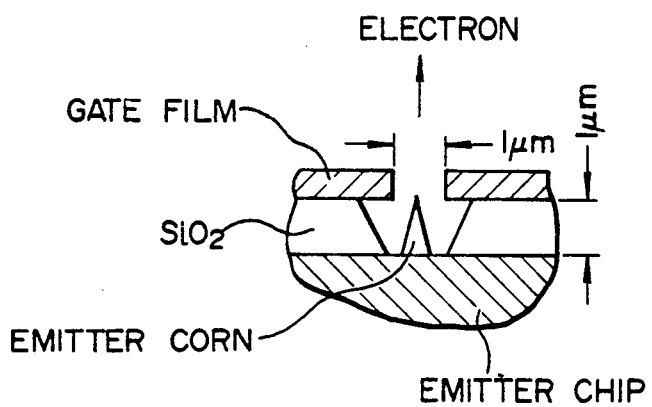
FIGS. 1A, 1B and 1C are diagrams showing conventional cold cathode devices of a field emission type, a tunneling type, and an avalanche type, respectively.
Figure 1B:
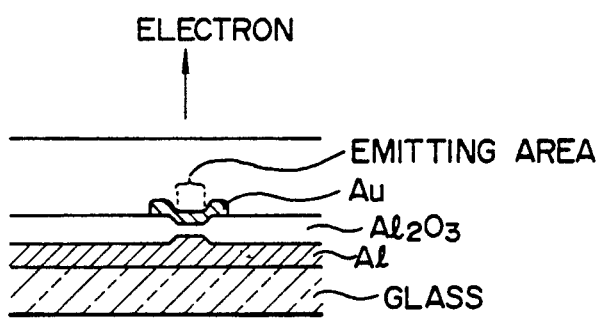
Figure 1C:
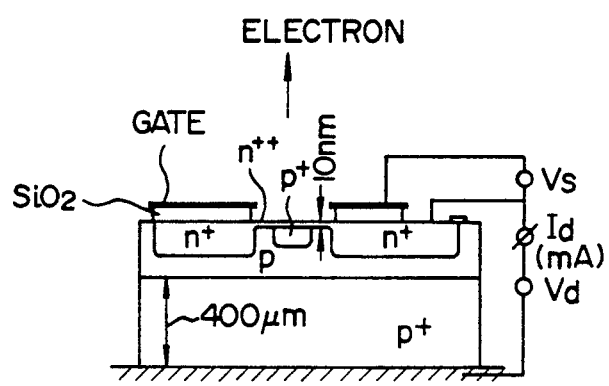
Figure 2A:
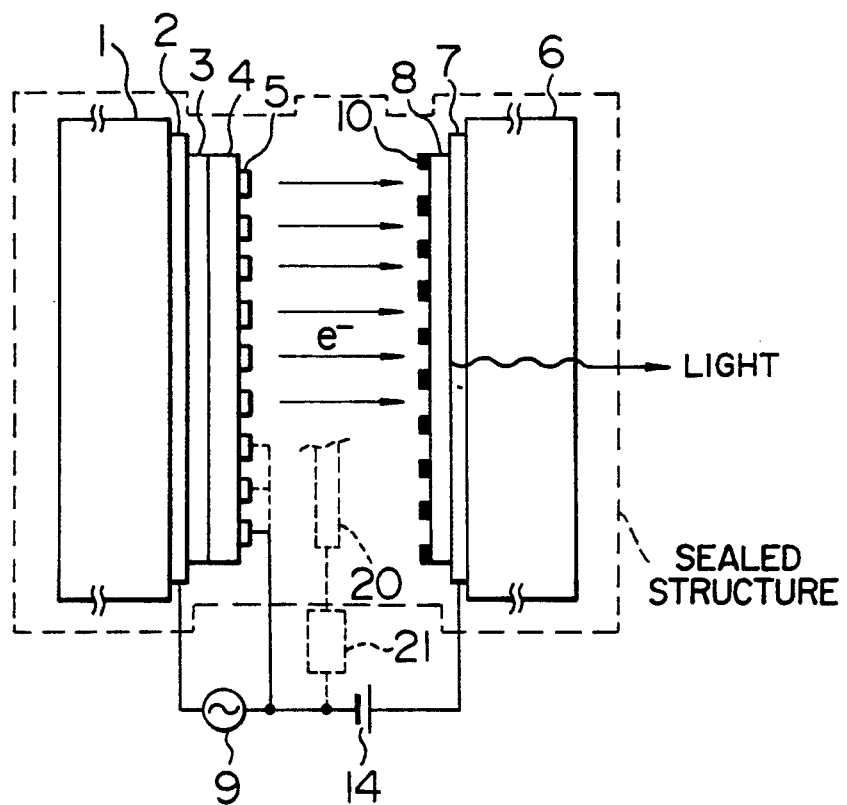
FIG. 2A is a sectional view showing the structure of a planar display device when a device having a cold cathode structure according to the present invention is applied to the planar display device.
Figure 2B:
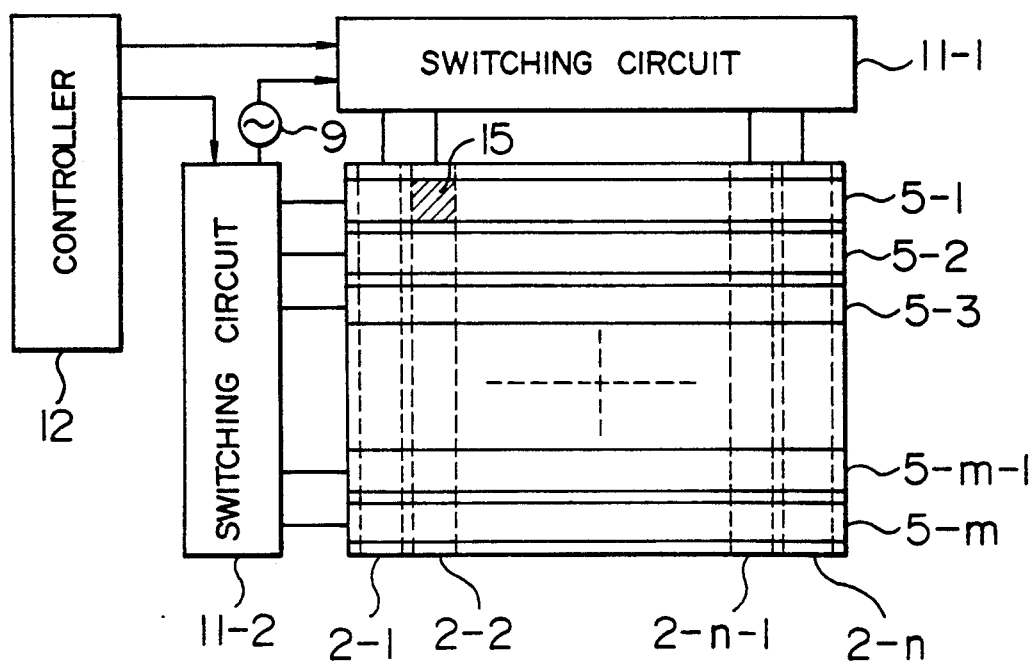
FIG. 2B is a view showing a planar structure of the cold cathode device shown in FIG. 2A.

FIG. 2A is a schematic section showing the structure of the planar display to which the present thin-film cold cathode device of the present invention is applied as an electron source. In FIG. 2A, the cold cathode device includes a substrate 1, a lower electrode 2, a thin insulating film 3, a thin film 4, and an upper electrode 5. The lower electrode 2 has a predetermined film thickness and is formed on the main surface (right side viewed in FIG. 2A) of the substrate made of material such as glass. The lower electrode 2 is made of a conductive material such as ITO (Indium Oxide having about 5 weight % of tin doped therein). As shown in FIG. 2B, the lower electrode 2 is patterned on the substrate 1.

On the lower electrode 2 is formed a thin insulating film 3 with a predetermined thickness. An insulating material such as tantalum oxide, silicon oxide, silicon nitride, or titanate or semiconductor material or organic substance having high resistance can be used as the material of the insulating film 3.

The thin film 4 is formed on the insulating film 3 to have a predetermined thickness. The thin film 4 is made of such a dielectric material like sulphide, oxide, arsenide or organic substance, and hot electrons can be generated from the dielectric material upon operation of the cold cathode device. However, the material of the thin film 4 is not limited to the dielectric material. The thin film 4 is required to be made of such a material having lower resistance than the insulating film 3 and higher resistance than the electrode 5. The dielectric material is usually an insulator, but is required to be conductive upon operation of the cathode device. More particularly, most of the voltage applied to the cold cathode device is applied to the film 3, and the remaining voltage is substantially applied to the film 4. In the case that the film 4 is made of the dielectric material, it is desirable that the electric field formed by the voltage applied to the film 4 is higher than a breakdown electric field of the dielectric material. At this time, unless the breakdown is caused in the film 3, the film 4 can be made conductive. Further, for efficiently emitting the hot electrons, it is desirable that the avalanche amplification is caused in the process of emitting electrons in the film 4.

The electrode 5 is formed on the thin film 4 to have a predetermined thickness. Preferably, the thickness of the electrode 5 is shorter than the mean free path of an electron. The electrode 5 is made of metal such as Au or Al or semiconductor material of low resistance. As shown in FIG. 2B, the electrode 5 is formed on the film 4 in such a patterned manner as crossing the pattern of the electrode 2 at right angles.

For forming each film and electrode of the cold cathode device, it is possible to employ a normal physical method such as sputtering, evaporation or a normal chemical method such as CVD, or a print method.

An anode opposed to the cold cathode device includes a substrate 6, an electrode 7, a phosphor or fluorescent material 8, and a mask 10. The substrate 6 is made of transparent material such as glass. On the main surface of the substrate 6 (left side viewed from FIG. 2A) is formed the electrodes 7 made of transparent material such as ITO. In the embodiment shown in FIG. 2A, the film 8 made of the phosphor of a type is coated on the electrode 7. However, phosphors generating red, blue and green fluorescences may be alternately coated on portions of the electrode 7 corresponding to the crossed patterns 15 of the electrodes 2 and 5. A mask 10 is formed on the phosphor film 8 on the other surface of the electrode 7, that is, on the portion of the electrode 7 not corresponding to the crossed patterns 15 of the electrodes 2 and 5.

The electrode 2 includes stripe patterns 2-1, ... ... 2-n, which are connected to a switching circuit 11-1, respectively. The electrode 5 includes stripe patterns 5-1, ... ... 5-m, which are connected to a switching circuit 11-2, respectively. The switching circuits 11-1 and 11-2 are connected to an a.c. power source 9 and a controller 12. The switching circuits 11-1 and 11-2 select the stripe patterns for an a.c. voltage to be supplied from the power source 9 in response to signals sent from the controller 12, respectively. As a result, the a.c. voltage is applied to the area 15, for example. In addition, a d.c. power source 14 is provided between a node of the power source 9 and the electrode 5 and the anode electrode 7.

In turn, a method for manufacturing the planar display shown in FIGS. 2A and 2B will be described below.

In order to form the cold cathode device structure, a transparent thin film 2 is formed of ITO on the substrate 1 by means of an evaporation method or a sputtering method. This film 2 has a thickness of about 0.2 $\mu$m and serves as the lower electrode. The electrode film 2 is patterned by means of a well-known lithography technique. Then, a thin insulating film 3 of $Ta_2O_5$ having a thickness of about 0.3 to 0.5 $\mu$m and subsequently a thin film 4 of ZnS having a thickness of about 0.3 to 0.5 $\mu$m are formed on the lower electrode 2 by the evaporation method or the sputtering method. Lastly, the film 5 of Au or Al having a thickness of about 0.01 $\mu$m or less is evaporated on the thin film 4 as the upper electrode 5. The upper electrode 5 is patterned by the well-known lithography technique.

Next, to form the anode structure, the electrode 7 is formed on the substrate 6 by means of the evaporation method, the CVD method or the sputtering method. The phosphor 8 of a predetermined thickness is coated on the electrode 7. Then, the mask 10 is formed on the phosphor 8 and is patterned by the well-known lithography technique.

The cold cathode structure is faced to the anode structure in parallel with a gap of a predetermined distance. The overall structure having the cold cathode structure and the anode structure opposed to each other is sealed, and the space between the cold cathode structure and the anode structure is evacuated from a vacuum.

Figure 3A:
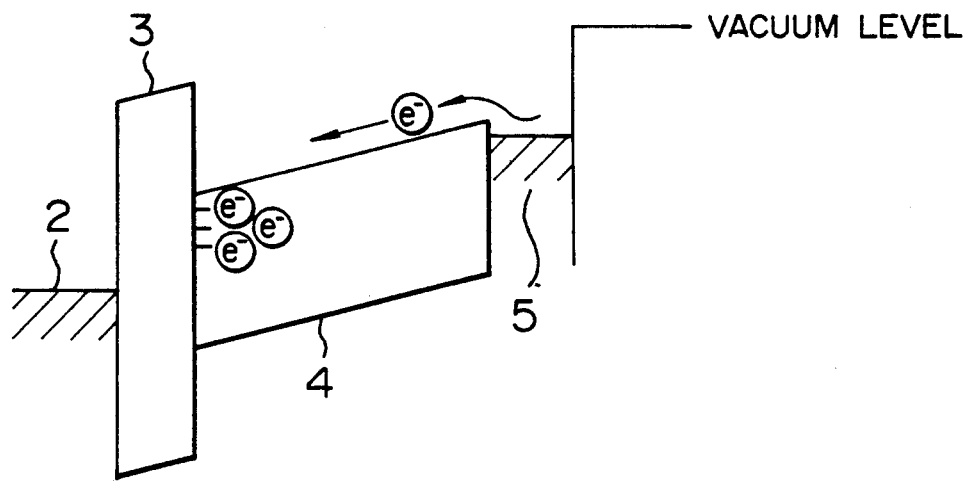
FIGS. 3A and 3B are energy band diagrams for explaining injection and emission of electrons into and from the cold cathode structure shown in FIG. 2A.

In turn, an operation of the planar display device will be described below with reference to FIGS. 3A and 3B.

In response to a signal sent from the controller 12, the switching circuits 11-1 and 11-2 select an area 15 to which an a.c. voltage from the a.c. power source 9 is to be applied. Then, the a.c. voltage is applied to the selected area 15. As shown in FIG. 3A, electrons are injected from the upper electrode 5-1 to the thin film 4 within a negative half cycle of the a.c. voltage, i.e., when the electrode 5 has a lower voltage than the electrode 2. The injected electrons are moved toward the thin insulating film 3 by the electric field in the thin film 4. Those electrons are stored at the neighbor of the boundary between the thin films 3 and 4. It results in forming a space charge layer at the neighbor of the boundary.

Figure 3B:
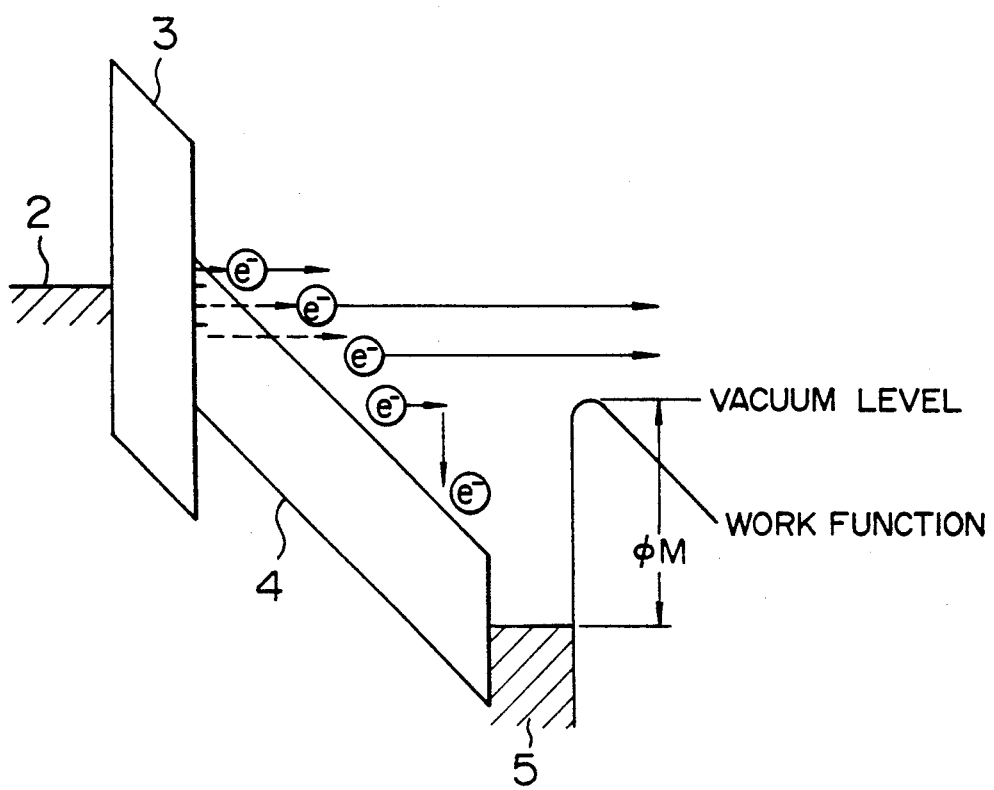

Next, as shown in FIG. 3B, the electrons stored in the space charge layer are accelerated by the electric field generated in the thin film 4 to become hot electrons within a positive half cycle, i.e., while the electrode 5 has a higher voltage than the electrode 2. The hot electrons having higher energy than the work function of the upper electrode 5-1 are emitted from the electrode 5-1 to the vacuum space, resulting in generation of the emitted electron current. At this time, because of the electric field caused by the space charge layer, a stronger electric field is caused in the thin film 4 than when the electrons are injected to the thin film 4.

The emitted electrons are accelerated by the electric field due to a d.c. voltage from several hundreds to several kilos volts from the d.c. power source 14 and moved straight toward the opposed area of the phosphor film 8. When the electrons collide with the opposed area, the phosphor in the area is excited and thereby light is emitted.

Figure 4:
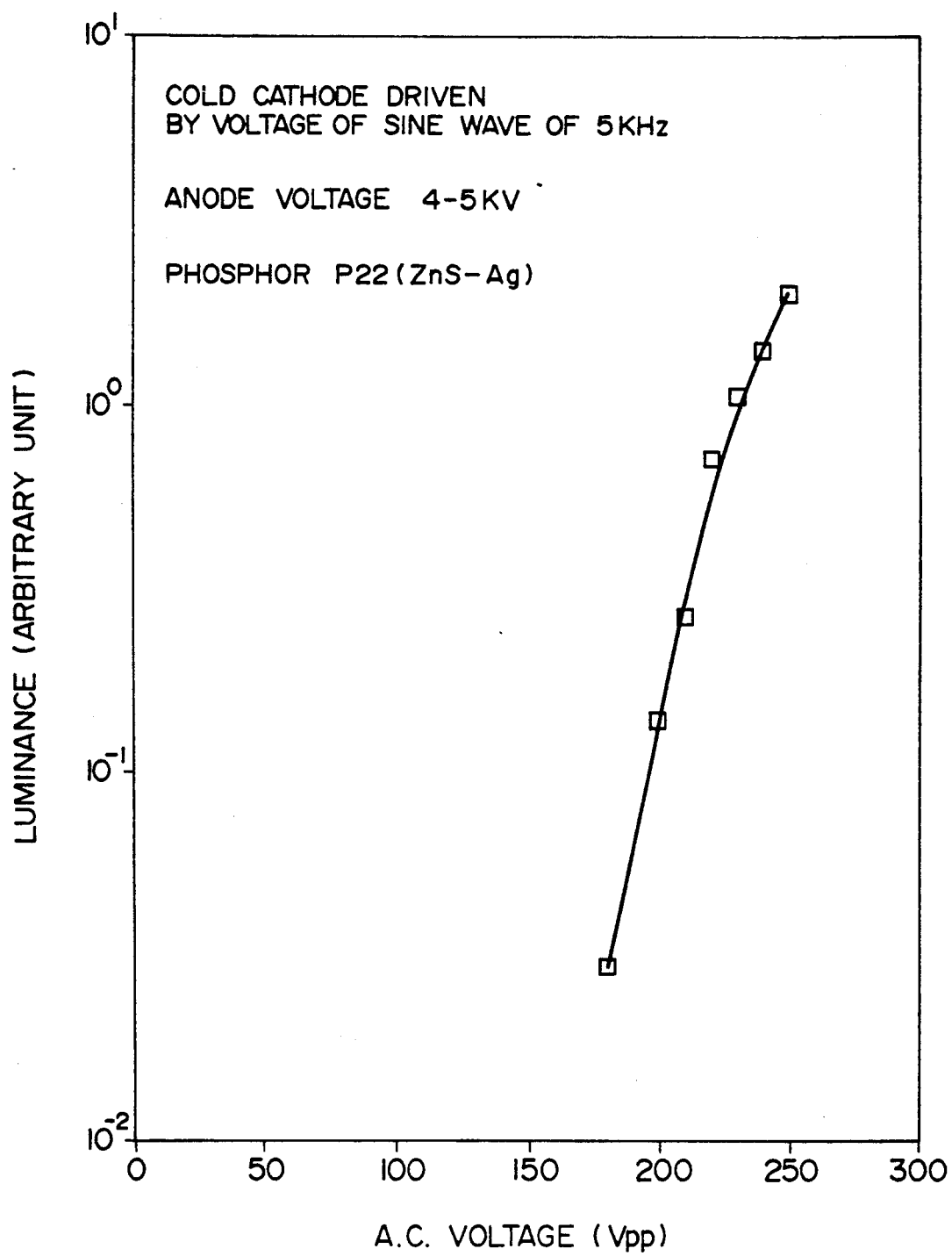
FIG. 4 is a graph showing a characteristic of luminance to a.c. voltage provided when a phosphor film is made luminous using the cold cathode device shown in FIG. 2A as an electron source.

FIG. 4 is a graph showing a characteristic of luminance to a.c. voltage in the planar display device having the cold cathode structure shown in FIGS. 2A and 2B. The characteristic shown in FIG. 4 is obtained when the phosphor is P22 (ZnS:Ag), the thin insulating film is made of $Ta_2O_5$, the thin film is made of ZnS, a sinuous voltage for driving the cold cathode has a frequency of 5 KHz, and the anode voltage is 4 to 5 kV.

The foregoing embodiment has been described to have a cold cathode structure of a flat plane. Alternatively, it may employ a curved plane structure.

As is apparent from the foregoing description, unlike the conventional field emission type of cold cathode device, the cold cathode device structure according to the present invention is little influence by the absorbed gaseous particles and does not require the super high vacuum. Moreover, the cold cathode device structure of the present invention is small in the fluctuation of emitted electron current and can provide a long life of cold cathode device. In addition, unlike the conventional tunneling type of cold cathode device, it requires not a very thin film but the laminated films and can be easily manufactured over a large area.

In the cold cathode device according to the present invention electrons can be emitted, in a planar and uniform manner. Hence, if such a cold cathode device is applied to the electron line lithography the accelerated electrons can be vertically radiated to a target photosensitive material, resulting in enhancing patterning accuracy. Further, by the electrons at a uniform current density, the patterned mask can be accurately produced.

Providing that the selected area 15 itself is fined as shown in FIG. 2B, the a.c. voltage source has a higher frequency, and the fined areas are properly selected for applying an a.c. voltage, the cold cathode device can provide substantially uniform electron current with respect to a time. In this case, the provision of a gate 20 and a gate power source 21 shown by a dotted line in FIG. 2A makes it possible to control the emitted electron current.

What is claimed is:

1. A cold cathode device comprising:
a first electrode formed on a substrate;
an insulating film formed on said first electrode;
a thin film formed on said insulating film for generating hot electrons, wherein said thin film has a major planar surface and an edge surface; and
a second electrode formed on said major planar surface of said thin film,
wherein said hot electrons are emitted from said major planar surface of said thin film in accordance with a voltage applied between said first and second electrodes.

2. A cold cathode device according to claim 1, wherein said thin film has smaller resistance than said insulating film and larger resistance than said first and second electrodes.

3. A cold cathode device according to claim 1, wherein said second electrode has a shorter thickness than the mean free path of an electron.

4. A cold cathode device according to claim 1, wherein said thin film is made of a dielectric material such as sulphide, oxide, arsenide or organic substance.

5. A cold cathode device according to claim 1, further comprising an a.c. power source connected between said first electrode and said second electrode.

6. A cold cathode device according to claim 5, wherein
each cycle of an a.c. voltage applied by said a.c. power source is comprised of first and second half cycles, electrons injected from said second electrode are moved toward said insulating film inside of said thin film to form a space charge layer at a boundary region between said thin film and said insulating film at the first half cycle, and the electrons in said space charge layer are emitted from said second electrode through said thin film at the second half cycle.

7. A cold cathode device according to claim 6, wherein
an absolute value of an electric field of said thin film at the second half cycle is larger than that at the first half cycle because of a voltage at the second half cycle and said space charge layer.

8. A cold cathode device according to claim 6, wherein the electrons accelerated inside of said thin film at the second half cycle perform avalanche amplification.

9. A cold cathode device according to claim 5, wherein
said first electrode is patterned into a plurality of first stripes and said second electrode is patterned into a plurality of second stripes, said first stripes being substantially crossed with said second stripes at right angles,
said device further comprises:
a first switching means connected to said plurality of first stripes, for selecting one of said plurality of first stripes in response to an input first control signal;
a second switching means connected to said plurality of second stripes, for selecting one of said plurality of second stripes in response to an input second control signal, said a.c. voltage from said a.c. power source being applied between said selected first and second stripes; and
control means for supplying said first and second control signals to said first and second switching signals at each predetermined period, respectively.

10. A cold cathode device according to claim 5, further comprising:
gate means provided apart from said second electrode, for controlling electron current formed by electrons emitted from said second electrode.

11. A flat panel display device comprising:
a cold cathode device having an a.c. power source for holding injected electrons at a first half cycle and emitting the held electrons at a second half cycle, each cycle of an a.c. voltage from said a.c. power source including the first and second half cycles;

an anode structure having a phosphor film, for receiving the electrons emitted from said cold cathode device;

sealing means for sealing said anode structure and said cold cathode device with a predetermined distance therebetween, a space between said anode structure and said cold cathode device being substantially vacuum; and a d.c. power source connected between said anode structure and said a.c. power source of said cold cathode device such that a positive voltage is applied to said anode structure, wherein said cold cathode device comprises:

a first electrode formed on a substrate;

an insulating film formed on said first electrode;

a thin film formed on said insulating film for generating hot electrons, wherein said thin film has a major planar surface and an edge surface; and a second electrode formed on said major planar surface of said thin film, wherein said hot electrons are emitted from said major planar surface of said thin film in accordance with a voltage applied between said first and second electrodes.

12. A flat panel display device according to claim 11, wherein said first electrode is patterned into a plurality of first stripes and said second electrode is patterned into a plurality of second stripes, each of said first stripes being substantially crossed with each of said second stripes at right angles, wherein said flat panel display device further comprises:

an a.c. power source;

a first switching means connected to said plurality of first stripes, for selecting one of said plurality of first stripes in response to an input first control signal to connect the selected first stripe to said a.c. power source;

a second switching means connected to said plurality of second stripes, for selecting one of said plurality of second stripes, for selecting one of said plurality of second stripes in response to an input second control signal to connect the selected second stripe to said a.c. power source; and control means for supplying said first and second control signals to said first and second switching means at each predetermined period, respectively, and wherein electrons injected from said second electrode are moved toward said insulating film by a first electric field inside of said thin film to form a space charge layer at a boundary region between said thin film and said insulating film, at a first half cycle, and hot electrons are generated from the electrons contained in said space charge layer by a second electric field inside of said thin film to be emitted from said second electrode through said thin film, at a second half cycle.

13. A flat panel display device according to claim 12, wherein a direction of said second electric field is opposite to that of said first electric field and said second electric field is stronger than said first electric field because of said space charge layer.

14. A flat panel display device according to claim 12, wherein the electrons accelerated inside of said thin film at the second half cycle perform avalanche amplification.

15. A flat panel display device according to claim 12, further comprising gate means provided apart from said second electrode between said anode structure and said cold cathode device, for controlling electron current of the electrons emitted from said second electrode.

16. A method for obtaining electron current from a cold cathode device, comprising the steps of:

injecting, in response to applying a first half of each cycle of a a.c. voltage between first and second electrodes, electrons into a thin film through said second electrode to form a space charge layer at a boundary region between an insulating film and a thin film, each cycle of the a.c. voltage including the first half and a second half, said cold cathode device comprising said first electrode formed on a substrate, said insulating film formed on said first electrode, said thin film formed on said insulating film, and said second electrode formed on said thin film;

generating hot electrons from the electrons stored in said space charge layer in response to applying at the second half cycle between said first and second electrodes; and emitting said generated hot electrons from said second electrode.

17. A method according to claim 16, wherein said generating step includes the step of performing avalanche amplification by using said generated hot electrons.

18. A method according to claim 16, further comprising the step of controlling electron current of the electrons emitted from said second electrode by a gate provided apart from said second electrode.

19. A cold cathode device comprising:

a first electrode formed on a substrate;

an insulating film formed on said first electrode;

a thin film formed on said insulating film;

a second electrode formed on said thin film;

means for causing a space charge layer to form at a boundary portion between said insulating film and said thin film in response to application of a first half cycle between said first and second electrodes, each cycle of an a.c. voltage including said first half cycle and a second half cycle; and means responsive to application of said second half cycle between said first and second electrodes, for causing hot electrons to be generated from the electrons stored in said space charge layer inside of said thin film and to be emitted from said second electrode.

20. A cold cathode device according to claim 19, further comprising:

gate means provided apart from said second electrode, for controlling electron current of the electrons emitted from said second electrode.

21. A cold cathode device comprising:

a first electrode formed on a substrate;

an insulating film formed on said first electrode;

a thin film formed on said insulating film;

a second electrode formed on said thin film;

means responsive to a first half cycle, for injecting electrons from said second electrode toward said insulating film, each cycle of an a.c. voltage including the first half cycle and a second half cycle; and means responsive to said second half cycle, for emitting said injected electrons from said second electrode.

22. A cold cathode device according to claim 21, further comprising:
  gate means provided apart from said second electrode, for controlling electron current of the electrons emitted from said second electrode.

23. A cold cathode device comprising:
  a first electrode formed on a substrate;
  an insulating film formed on said first electrode;
  a thin film formed on said insulating film for generating hot electrons; and
  a second electrode formed on said thin film, wherein said thin film has smaller resistance than said insulating film and larger resistance than said first and second electrodes.

24. A cold cathode device comprising:
  a first electrode formed on a substrate;
  an insulating film formed on said first electrode;
  a thin film formed on said insulating film for generating hot electrons; and
  a second electrode formed on said thin film, wherein said second electrode has a shorter thickness than the mean free path of an electron in the second electrode.

25. A cold cathode device comprising:
  a first electrode formed on a substrate;
  an insulating film formed on said first electrode;
  a thin film formed on said insulating film for generating hot electrons; and
  a second electrode formed on said thin film, wherein said thin film is made of a dielectric material such as sulphide, oxide, arsenide or organic substance.

26. A cold cathode device comprising:
  a first electrode formed on a substrate;
  an insulating film formed on said first electrode;
  a thin film formed on said insulating film for generating hot electrons; and
  a second electrode formed on said thin film, further comprising an a.c. power source connected between said first electrode and said second electrode.

27. A cold cathode device according to claim 26, wherein each cycle of an a.c. voltage applied by said a.c. power source is comprised of first and second half cycles, electrons injected from said second electrode are moved toward said insulating film inside of said thin film to form a space charge layer at a boundary region between said thin film and said insulating film at the first half cycle, and the electrons in said space charge layer are emitted from said second electrode through said thin film at the second half cycle.

28. A cold cathode device according to claim 27, wherein an absolute value of an electric field of said thin film at the second half cycle is larger than that at the first half cycle because of a voltage at the second half cycle and said space charge layer.

29. A cold cathode device according to claim 27, wherein the electrons accelerated inside of said thin film at the second half cycle perform avalanche amplification.

30. A cold cathode device according to claim 26, wherein said first electrode is patterned into a plurality of first stripes and said second electrode is patterned into a plurality of second stripes, said first stripes being substantially crossed with said second stripes at right angles,
  said device further comprises:
  a first switching means connected to said plurality of first stripes, for selecting one of said plurality of first stripes in response to an input first control signal;
  a second switching means connected to said plurality of second stripes, for selecting one of said plurality of second stripes in response to an input second control signal, said a.c. voltage from said a.c. power source being applied between said selected first and second stripes; and
  control means for supplying said first and second control signals to said first and second switching signals at each predetermined period, respectively.

31. A cold cathode device according to claim 26, further comprising:
  gate means provided apart from said second electrode, for controlling electron current formed by electrons emitted from said second electrode.

* * * * *